Patented Aug. 12, 1941

2,252,138

UNITED STATES PATENT OFFICE 2,252,138

PROCESS FOR PRODUCTION OF THIOETHERS

John T. Rutherford, Berkeley, Calif., assignor to Standard Oil Company of California, San Francisco, Calif., a corporation of Delaware No Drawing. Application January 21, 1941, Serial No. 375,295

11 Claims. (Cl. 260—609)

This invention relates to a new and improved process of manufacturing alkyl thioethers. It involves the absorption of olefins and hydrogen sulfide in concentrated sulfuric acid followed by hydrolysis of the acid solution formed by such absorption and the separation of the oil and acid layers resulting from the hydrolysis of said acid solution.

As an example, cracked naphtha rectifier reflux gas containing the following was employed as charging stock:

| | Per cent by volume |
|---|---|
| Propene | 20 |
| Ethene | 5 |
| Butenes and butanes | 2 |
| Hydrogen sulfide | 6 |
| Ethane | 25 |
| Methane | 12 |
| Propane | 30 |
| | 100 |

The whole gas was scrubbed in a tower with 98% strength sulfuric acid. Compounds insoluble in the sulfuric acid, such as the saturated compounds, butane, ethane, methane, propane, in this example, were permitted to pass off. The acid solution containing the absorbed olefins and hydrogen sulfide was then hydrolyzed at elevated temperatures and under pressure. The hydrolysis of the acid solution resulted readily in the formation of a lower, acid layer and an upper, oily layer. The two layers were then separated. The raw alkyl thioethers exist in the upper, oily layer. The lower, acid layer may be made ready for further absorption of olefins and hydrogen sulfide by concentration or fortification. In order to effect the hydrolysis the amount of water which was added was sufficient to reduce the strength of said lower, acid layer to about 45% $H_2SO_4$ by weight.

The alkyl thioethers produced, which consisted largely of isopropyl thioether, had an average sulfur content of 24.1%, an A. S. T. M. boiling range of 170° to 488° F., a mercaptan sulfur content of 0.22% and a disulfide sulfur content of 0.14%.

Applicant wishes to emphasize that the alkyl thioethers formed by applicant's process resulted from the hydrolysis of the acid solution. When hydrogen sulfide and olefins are mixed with sulfuric acid there is sometimes formed, depending on conditions of operations and other substances present, an acid solution and an upper, oily layer. Such upper, oily layer may or may not contain alkyl thioethers and other sulfur compounds such as mercaptans. Applicant's process is not concerned with sulfur compounds so formed. According to applicant's process alkyl thioethers are formed, as described, solely by the hydrolysis of the acid solution. The olefins may, of course, naturally be mixed with an adequate supply of hydrogen sulfide as in the above example, or hydrogen sulfide may be added to hydrogen sulfide-free olefins. Purification and fractionation of the raw thioethers will, of course, depend on the nature of the product desired and its intended uses.

The process is applicable to all olefins, polyolefins and olefin polymers. It is preferred, however, not to employ ethene, because of its limited solubility in concentrated sulfuric acid.

Compounds such as propene, the butenes, amylenes, hexenes, heptenes and octenes are generally used. However, the higher homologues and the analogues, such as phenyl and naphthyl ethenes, propenes, butenes, etc. may also be used. Among the polyolefins which may be used are divinyl, dialkyl, isoprene, di-isoprenyl, di-isobutenyl, etc. Among the olefin polymers which may be used are di-isobutene, tri-isobutene, and the like.

It has been found desirable not to employ an excess of hydrogen sulfide beyond that required for the reaction. The use of an excess of hydrogen sulfide results in the formation of free sulfur and sulfur dioxide according to the reaction:

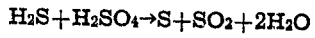
$$H_2S + H_2SO_4 \rightarrow S + SO_2 + 2H_2O$$

which in turn reduces the yield of the desired thioethers, increases acid losses, introduces corrosion problems and complicates the subsequent processing of the acid solution formed by the absorption of the olefins and hydrogen sulfide in the sulfuric acid.

It is preferred to have the sulfuric acid employed for absorption to be of a concentration between 88% and 98%. The products obtained at various concentrations of the acid have similar characteristics, but the absorption of olefins and hydrogen sulfide diminishes and approaches zero when the concentration of the acid approaches 60–65%. Therefore, with higher acid concentrations larger volumes of these materials can be absorbed for equivalent weights of sulfuric acid.

When higher molecular weight, less volatile olefins were employed, such as dodecene, a solution of the olefins in inert mineral oil was saturated with hydrogen sulfide and the whole agitated with sulfuric acid which scrubbed out the olefins and hydrogen sulfide and from which the inert mineral oil was readily separated. This was followed by the usual steps of hydrolysis, separation and further refining of the raw high molecular weight alkyl thioethers. The purpose of first dissolving the high molecular weight olefins in the inert mineral oil and then introducing the gaseous hydrogen sulfide was to provide a method of introducing the liquid olefins and the gaseous hydrogen sulfide simultaneously into the sulfuric acid. The inert mineral oil of course was not absorbed by the sulfuric acid. Any suitable inert solvent not soluble in the sulfuric acid may, of course, be substituted.

The absorption of the olefins and hydrogen sulfide in the concentrated sulfuric acid was accomplished by passing the same in gaseous form to the bottom of a tower of sulfuric acid and allowing the same to bubble through the sulfuric acid. The desired reaction products of such absorption were drawn off from the bottom of the tower for hydrolysis.

Improved results were obtained by conducting the absorption at maximum pressures consistent with the vapor pressure of the gases. Among the advantages of operating at elevated pressures are more efficient utilization of feed stocks and the employment of higher feed rates without flooding the treating chamber.

It was also found that best results were obtained when the absorption was conducted at temperatures in excess of 70° F.

For the complete hydrolysis of the acid solution it has been found desirable to use elevated temperatures in the order of 300° F. At this temperature, an operating pressure of seventy-five pounds per square inch is necessary. Hydrolysis of the acid solution at lower temperatures tends to result in inadequate stratification. Operating at elevated temperatures also results in the formation of a lower amount of carbonaceous material in the recovery of sulfuric acid which in turn tends to reduce regeneration losses.

If superatmospheric pressure and elevated temperatures are employed for hydrolysis of the acid solution, complete stratification is obtained and the sulfide oil layer may be removed mechanically.

It has been found that the hydrolysis of the acid solution is very materially facilitated by addition of an amount of water sufficient to reduce the strength of the acid solution to approximately 45%.

Further examples of the process described herein are set out below.

1. Octyl thioether was produced as follows: Natural gas, largely methane, a saturated hydrocarbon, was bubbled through octene polymers having a boiling range from 220° to 230° F. to produce a gaseous mixture containing approximately 93% natural gas, 6% octene vapor (1600 cc.), and 1% hydrogen sulfide. The gaseous mixture was then passed into 2800 cc. of sulfuric acid for three hours. The spent acid was then diluted to 45% strength and heated under seventy-five pounds pressure for two hours. The sulfide layer was removed and, after being washed with caustic and water, was distilled under vacuum. Thioethers boiling from 260° to 390° F. at 10 mm. pressure were obtained, along with a considerable proportion of lower-boiling sulfides. The heavy friction had a molecular weight of 250 and an 11.8% sulfur content.

2. Dodecyl thioether was manufactured as follows: 1600 grams of a fraction, averaging approximately 12 carbon atoms per molecule, from a gasoline synthesized by polymerizing olefins were dissolved in 10,700 grams of mineral white oil together with 86 grams of hydrogen sulfide. This solution was thoroughly contacted with 4,600 cc. of sulfuric acid, after which the mineral white oil was separated, the olefin polymers and the hydrogen sulfide having been absorbed by the sulfuric acid. To the resulting 5,400 cc. of 83.6% strength sulfuric acid solution was added sufficient water to reduce the sulfuric acid to 45% strength. The diluted acid solution was heated under reflux for two hours at a temperature of 300° F. and a pressure of 75 lbs. 800 grams of crude sulfides were separated from the dilute acid upon cooling. The sulfides were then distilled and gave the characteristics shown in Table I below:

Table I

| Boiling range | Yield in gms. | Average molecular weight | Per cent sulfur |
|---|---|---|---|
| 180° to 400° F. 760 mm | 130 | 150 | 9.1 |
| Up to 240° F. 6 mm | 145 | 189 | 10.8 |
| 240° to 310° F. 6 mm | 74 | 212 | 9.3 |
| 310° to 410° F. 6 mm | 108 | 255 | 7.4 |
| 410° to 510° F. 6 mm | 140 | 336 | 4.7 |
| 510° to 560° F. 6 mm | 44 | 384 | 4.0 |
| | 641 | | |

Dodecyl propyl thioether was obtained by the following method: 2,000 cc. of the acid solution prepared as described in the method set forth above for the manufacture of dodecyl thioether were mixed with 1,500 cc. of acid solution produced according to the method of manufacturing propyl thioether described above. The mixture was hydrolyzed after being diluted with water and produced 600 cc. (564 grams) of sulfide which, upon being distilled, had the following characteristics:

| Boiling range | Yield in gms. | Average molecular weight | Per cent sulfur |
|---|---|---|---|
| Up to 450° F. 760 mm | 186 | | 19.1 |
| Up to 220° F. 7 mm | 24 | | 20.0 |
| 220° to 280° F. 7 mm | 49 | 207 | 16.1 |
| 280° to 380° F. 7 mm | 86 | 265 | 12.1 |
| 380° to 450° F. 7 mm | 49 | 333 | 9.8 |
| | 394 | | |

Other processes involving the absorption of olefins and hydrogen sulfide in concentrated sulfuric acid have been disclosed. See, for instance, the United States Patent No. 1,836,170 issued to Ernest M. Johansen. Such processes are not, however, to be confused with the process described herein for numerous reasons. Contrary to reasonable assumptions, for instance, the process described herein produces alkyl thioethers of either high or low molecular weight with the formation of only a trace of mercaptans and disulfides. The products obtained as described herein are obtained not from the oily layer above the acid layer resulting from the absorption of the charging stock in the sulfuric acid, as described in United States Patent No. 1,836,170, but from the oily layer above the weak acid layer resulting from the hydrolysis of the strong acid solution resulting from such absorption. The hydrolysis is an integral part of the invention described herein, and the process fails without it. Another advantage of the invention described herein is the fact that the hydrolysis step also results in the regeneration of substantially all the acid used as an absorption medium.

The invention described herein is not to be deemed limited to the above specific disclosures given merely by way of example, but only by the following claims in which it is desired to claim all novelty insofar as the prior art permits.

I claim:

1. The process of manufacturing alkyl thioethers, substantially without formation of mercaptans or polysulfides, comprising absorbing olefins and hydrogen sulfide in concentrated sulfuric acid, diluting and hydrolyzing the resulting acid mixture and separating the alkyl thioethers from the hydrolyzed mixture, the sulfuric acid being regenerated by such steps.

2. The process according to claim 1 in which the sulfuric acid strength is above 55%.

3. The process according to claim 1 in which the hydrolysis is effected at superatmospheric pressures and temperatures.

4. The process according to claim 1 in which the amount of hydrogen sulfide employed is not substantially in excess of that theoretically required to produce the said alkyl thioethers.

5. The process according to claim 1 in which the amount of hydrogen sulfide employed is in substantially stoichiometrical proportions required to produce the said alkyl thioethers.

6. The process according to claim 1 in which the amount of water added, for the hydrolysis step, to the reaction mixture formed by the absorption of olefins and hydrogen sulfide in sulfuric acid is sufficient to reduce the strength of the sulfuric acid to below 60%.

7. The process according to claim 1 in which the olefins and hydrogen sulfide are mixed prior to absorption in the sulfuric acid.

8. The process according to claim 1 in which the olefins employed are liquid at atmospheric temperatures and pressures and in which the said olefins and hydrogen sulfide are first absorbed in an inert solvent insoluble in sulfuric acid, and then, from such absorbed state, are absorbed in said sulfuric acid.

9. The process according to claim 1 in which the olefins employed are liquid at atmospheric temperatures and pressures and in which said olefins are first gasified by means of admixture with an inert, sulfuric acid-insoluble gas and are then absorbed in said sulfuric acid after said gaseous mixture is first mixed with said hydrogen sulfide.

10. The process according to claim 1 in which the said alkyl thioethers are separated from said hydrolyzed mixture by mechanical means.

11. The process of manufacturing alkyl thioethers, substantially without formation of mercaptans or polysulfides, comprising absorbing a mixture of olefins and hydrogen sulfide in sulfuric acid of a strength in excess of 55%, the amount of said hydrogen sulfide employed being in the substantially stoichiometrical proportion required to produce the said thioethers, diluting and hydrolyzing the reaction mixture formed by such absorption, at superatmospheric pressure and temperature, by the addition of an amount of water sufficient to reduce the strength of said reaction mixture to below 60%, separating the thioethers so formed from the reaction mixture, the sulfuric acid employed in said process being regenerated as a result of such hydrolysis.

JOHN T. RUTHERFORD.